Patented Apr. 23, 1935

1,998,541

UNITED STATES PATENT OFFICE 1,998,541

IRON OXIDE PIGMENT AND PROCESS OF PRODUCING THE SAME AS BY-PRODUCTS OF THE REDUCTION OF AROMATIC NITRO COMPOUNDS

Ulrich Haberland, Uerdingen, Germany, assignor to I. G. Farbenindustrie Aktiengesellschaft, Frankfort-on-the-Main, Germany No Drawing. Application December 19, 1931, Serial No. 582,172. In Germany December 27, 1930

9 Claims. (Cl. 134—59)

The present invention relates to a process of producing iron oxide pigments; more specifically it relates to a process in which a finely divided iron oxide sludge suitable as a color pigment after drying or calcining is obtained as a by-product from the reduction of aromatic nitro compounds to the corresponding amines by means of iron and acid or an acid reacting salt.

In the methods of producing aromatic amines from aromatic nitro compounds heretofore known and used from a long time involving the use of iron and an amount of acid insufficient to dissolve the same or a salt exerting an acid reaction due to hydrolysis, the iron serving as the reducing agent generally changes into a brownish black oxide whose composition corresponds to a formula lying between $Fe_3O_4$ and $Fe_2O_3$. This oxide is not useful as a color pigment and is of very inferior quality on account of its slight coloring and covering power.

To illustrate the old process it may stated that in the manufacture of aniline with every 100 parts of nitrobenzene about 100 parts of iron, 8 to 10 parts of concentrated hydrochloric acid (specific gravity 1.16) and about 100 parts of water are employed. The reduction is carried out by adding the nitrobenzene and iron to the hydrochloric acid and water heated to about 100° at such a rate that the temperature of about 100° C. is maintained by the heat of reaction. When reduction is finished, the oily layer of aniline is drawn off and the remaining aqueous liquid distilled by steam after having added some lime, if necessary. The iron oxide represents a waste product of no commercial value. As is further known, the hydrochloric acid employed in the reduction may be substituted by a more or less equivalent quantity of sulfuric acid, acetic acid, sulfurous acid or the like or by a dilute solution i. e. an aqueous solution containing less than 5 percent of a salt exerting an acid reaction due to hydrolysis such as ferrous chloride without changing the properties of the resulting iron oxide sludge.

In accordance with the processes described in U. S. application Serial No. 385,457, filed August 12, 1929, now Patent No. 1,849,428, and U. S. Patents 1,793,941 and 1,793,942 the reduction is carried out under such conditions that the aqueous phase of the reaction mixture is an acid-reacting highly concentrated salt solution, i. e. an aqueous solution which contains at least 12 percent of a dissolved salt, preferably 15 to 25 percent and the concentration of which may rise as far as the saturating concentration of the respective salt and does not fall below the limit of 12 percent during the reduction process. Under the conditions specified in the aforesaid patents there remains after separating the aromatic amine obtained by the reduction process an iron oxide sludge which is substantially free from acidic residues and is adapted to form commercial iron oxide pigments, either directly or after calcination.

The present invention is an improvement of the process claimed in the U. S. application Serial No. 385,457, filed August 12, 1929, now Patent No. 1,849,428, and U. S. Patents 1,793,941 and 1,793,942. I have found that an addition of a compound containing an anion of an oxygen-acid of phosphorus to the reduction agents of the aforesaid specifications will considerably improve the commercial grade of the iron oxide pigments obtainable as by-products of the reduction process. In other words my process comprises as the principal feature reducing an aromatic nitro compound with an acid-reacting mixture comprising metallic iron, a compound containing an anion of an oxygen-acid of phosphorus and a concentrated aqueous solution of a salt, it being understood that the acidity of the mixture should not suffice to dissolve the iron and the amount and concentration of the salts present should be sufficient to form an iron oxide sludge adapted to form a commercial iron oxide pigment. When carrying out the reduction in the presence of a compound containing an anion of an oxygen acid of phosphorus a solution is obtained from which after levigation, washing out and drying at temperatures from about 100° C. to 200° C. iron hydroxides result which have a light to dark brown shade. These iron hydroxides may be converted to bright red to dark violet iron oxide pigments by calcining them at a temperature range from about 650° C. to about 800° C. and preferably at a temperature of about 700° C.

The amount of the compound containing an anion of an oxygen-acid of phosphorus, such as ortho-phosphoric acid, pyrophosphoric acid, meta-phosphoric acid, phosphorous acid and the salts of these acids, such as sodium phosphate, ammonium phosphate, sodium phosphite, aniline phosphate, aniline phosphite etc., used in the reduction may vary within wide ranges it being understood that the mixture by which the reduction is performed possesses an acid reaction and that the acidity of this mixture remains insufficient to dissolve the iron. Calculated on the quantity of metallic iron used it may vary from about 2 percent to about 15 percent of free phosphoric acid or an equivalent amount of another oxygen-acid of phosphorus or an equivalent amount or more of a salt of the acids mentioned before.

Before calcining the pigments obtained according to this invention comprise substantially ferric oxide with a small content of ferrous oxide. Furthermore these pigments contain compounds of phosphorus in an amount depending on the amount of compounds of phosphorus employed in the reduction process.

My new brown iron oxide pigments are homogeneous and may thus be distinguished from the previously known brown iron oxide pigments. A microscopic examination will show that each of their constituent particles is of a uniform, brown shade, whereas the previously known brown iron oxide pigments consist of a mixture of red, black and, in some cases, also yellow particles. It is possible to isolate these differently colored constituents of the known pigments by purely physical means, such as, for example, levigation. In the case of my new pigments such an isolation of vari-colored constituents is, of course, impossible in view of their homogeneous character.

My invention is illustrated by the following examples without being restricted thereto. The parts are by weight. Other aromatic nitro compounds such as α-nitronaphthalene, ortho-nitrotoluene and furthermore chloro-, hydroxy- and amino-nitro compounds, poly-nitro compounds and nitrosulfonic acids may be used and in particular I wish to be understood that all the salts covered by the above mentioned U. S. application Serial No. 385,457, filed August 12, 1929, now Patent No. 1,849,428, and U. S. Patents 1,793,941 and 1,793,942 will be operative in the process claimed in this specification and these patents.

*Example 1*

127 parts of a ferrous chloride solution of specific gravity 1.27 are mixed with 10 parts of phosphoric acid in 150 parts of water, 200 parts of ground iron powder are added and 200 parts of nitro benzene are run in at boiling temperature. When the reduction is complete and the aniline produced has been separated there are obtained by levigation, washing and drying the sludge produced 250 parts of a mineral pigment of beautiful dark brown shade and very satisfactory covering power. This pigment comprises 86.5 percent of ferric oxide, 3.0 percent of ferrous oxide and 2.7 percent of phosphorus calculated as phosphorous pentoxide.

When instead of the above specified quantity of 10 parts of phosphoric acid 16 parts are used a valuable light brown iron oxide pigment is produced.

Calcination yields from these products vivid, light red to dark violet red iron oxide pigments.

*Example 2*

To a mixture of 127 parts of a ferrous chloride solution of specific gravity 1.27 and 18 parts of phosphorous acid and 40 litres of water are added 200 parts of ground iron powder. Then 200 parts of nitrobenzene are run in at boiling temperature. After completion of the reduction the aniline produced is separated. The sludge obtained is levigated, washed and dried. There result 250 parts of a mineral pigment of a fine dark brown shade which possesses an excellent covering power. By calcining this pigment at a temperature of 700° C. a dark red violet iron oxide pigment is obtained.

*Example 3*

127 parts of a ferrous chloride solution of specific gravity 1.27 are mixed with 14 parts of ammonium phosphate in 40 parts of water, 20 parts of ground iron powder are added and then 200 parts of nitro benzene are run in at boiling temperature. After completion of the reduction and separating the aniline produced there are obtained by levigation, washing and drying the slurry produced 250 parts of a mineral pigment of beautiful brown black shade. This pigment has a very satisfactory covering power.

Calcination yields from this product a violet red iron oxide pigment.

I claim:

1. The process which comprises reducing an aromatic nitro compound with an acid-reacting mixture comprising metallic iron, a concentrated aqueous solution of a salt and a compound containing an anion of an oxygen-acid of phosphorus, the acidity of the mixture being insufficient to dissolve the iron, separating the resulting iron oxide sludge from the resulting aromatic amino compound and purifying the iron oxide sludge by levigation and washing.

2. The process which comprises reducing an aromatic nitro compound with an acid-reacting mixture comprising metallic iron, a concentrated aqueous solution of a salt and a compound containing an anion of an oxygen-acid of phosphorus, the acidity of the mixture being insufficient to dissolve the iron, separating the resulting iron oxide sludge from the resulting aromatic amino compound and purifying the iron oxide sludge by levigation, washing out, drying and calcining.

3. The process which comprises reducing an aromatic nitro compound with an acid-reacting mixture comprising metallic iron, a concentrated aqueous solution containing at least 12 percent of a dissolved salt and a compound containing an anion of an oxygen-acid of phosphorus the acidity of the mixture being insufficient to dissolve the iron, separating the resulting iron oxide sludge from the resulting amino compound and purifying the iron oxide sludge by levigation and washing out.

4. The process which comprises reducing an aromatic nitro compound with an acid-reacting mixture comprising metallic iron, a concentrated aqueous solution containing at least 12 percent of a dissolved metal salt and a compound containing an anion of an oxygen-acid of phosphorus the acidity of the mixture being insufficient to dissolve the iron, separating the resulting iron oxide sludge from the resulting amino compound and purifying the iron oxide sludge by levigation and washing out.

5. The process which comprises reducing an aromatic nitro compound with an acid-reacting mixture comprising metallic iron, a concentrated aqueous solution containing at least 12 percent of dissolved ferrous chloride and a compound containing an anion of an oxygen-acid of phosphorus the acidity of the mixture being insufficient to dissolve the iron, separating the resulting iron oxide sludge from the resulting amino compound and purifying the iron oxide sludge by levigation and washing out.

6. The process which comprises reducing an aromatic nitro compound in the presence of a salt of an oxygen-acid of phosphorus with metallic iron and an acid-reacting concentrated aqueous solution containig at least 12 percent of a dissolved salt in an amount insufficient to dissolve the iron, separating the resulting iron oxide sludge from the resulting amino compound and purifying the iron oxide sludge by levigation and washing out.

7. The process which comprises reducing nitro benzene with an acid-reacting mixture comprising metallic iron a concentrated aqueous solution containing at least 12 percent of dissolved ferrous chloride and ammonium phosphate the acidity of the mixture being insufficient to dissolve the iron, separating the resulting iron oxide sludge from the resulting amino compound and purifying the iron oxide sludge by levigation and washing out.

8. The process which comprises reducing nitro benzene with metallic iron, a concentrated aqueous solution containing at least 12 percent of ferrous chloride and an amount of phosphoric acid insufficient to dissolve the iron, separating the resulting iron oxide sludge from the resulting aromatic nitro compound and purifying the iron oxide sludge by levigation and washing out.

9. Metallic oxide pigments comprising a major proportion of ferric oxide and a minor proportion of ferrous oxide and an oxygen compound of phosphorus, said pigments being homogeneous and having light to dark brown shades which may be converted by calcination into bright red to dark violet shades.

ULRICH HABERLAND.